(12) United States Patent
Sakane et al.

(10) Patent No.: US 6,742,784 B2
(45) Date of Patent: Jun. 1, 2004

(54) WEATHER STRIP

(75) Inventors: Tomoaki Sakane, Kanagawa (JP);
Tatsumi Onishi, Kanagawa (JP);
Hirosuke Kamae, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/108,267

(22) Filed: Mar. 28, 2002

(65) Prior Publication Data

US 2002/0185824 A1 Dec. 12, 2002

(30) Foreign Application Priority Data

| Mar. 28, 2001 | (JP) | 2001-091812 |
| Oct. 31, 2001 | (JP) | 2001-334155 |
| Mar. 20, 2002 | (JP) | 2002-078831 |

(51) Int. Cl.$^7$ .............................................. F16J 15/02
(52) U.S. Cl. ............................................... 277/628
(58) Field of Search ..................... 277/630, 628, 277/921

(56) References Cited

U.S. PATENT DOCUMENTS

| 3,627,337 A | * | 12/1971 | Pippert | 277/537 |
| 4,442,156 A | * | 4/1984 | Yamaguchi | 428/142 |
| 4,708,351 A | * | 11/1987 | Midooka et al. | 277/650 |
| 5,007,202 A | * | 4/1991 | Guillon | 49/441 |
| 6,390,480 B1 | * | 5/2002 | Smith | 277/630 |

FOREIGN PATENT DOCUMENTS

| EP | 0 978 404 | 2/2000 |
| JP | 61-4408 | 2/1986 |
| JP | 2000-52780 | 2/2000 |

OTHER PUBLICATIONS

*Dictionary of Plastics Technology*, Kougyou Chousakai Kabushiki Kaisha (Oct. 20, 1994), 777–778.
JIS B 0651, Japanese Industrial Standard, "Geometrical Product Specifications (GPS)–Surface texture: Profile method–Nominal characteristics of contact (stylus) instruments," Jan. 01, 2001, Japanese Standards Association.
JIS B 0601, Japanese Industrial Standard, "Surface roughness–Definitions and designation," Jan. 2001, Japanese Standards Association.

* cited by examiner

*Primary Examiner*—William L. Miller
(74) *Attorney, Agent, or Firm*—Foley & Lardner LLP

(57) ABSTRACT

A weather strip or glass run for an automotive vehicle. The weather strip comprises a main body formed of an elastomer. A slidably contacting section to which a part other than the weather strip is slidably contactable is fixedly formed on the main body and contains a material having at least one of hydrophilicity and water absorbability. The slidably contacting section may be integral with the main body to form a one-piece structure, in which the slidably contacting section is formed of the elastomer, and the elastomer of the main body and the slidably contacting section contain the material having at least one of hydrophilicity and water absorbability.

23 Claims, 3 Drawing Sheets

WEATHER STRIP

BACKGROUND OF THE INVENTION

This invention relates to improvements in a weather strip and particularly to the weather strip for sealing a movable or lid member and a body so as to prevent invasion of rain water and wind noise, and more particularly to the weather strip used as a glass run, a door weather strip, a body-side weather strip, an inside seal, an outside seal and the like of an automotive vehicle.

In general, an automotive vehicle uses a variety of weather strips including a glass run, a door weather strip, a body-side weather strip, an inside seal, an outside seal and the like. Hitherto, it has been proposed and put into practical use that each of the glass run, the door weather strip, the body-side weather strip, the inside seal, the outside seal and the like has a slidably contacting surface portion to which a movable member such as a glass (plate) is in slidable contact. The slidably contacting surface portion is subjected to a surface treatment with a polyurethane-based or silicone-based surface treatment agent, or covered with flock or pile in order to improve a slidably contacting ability of the weather strip to the glass.

However, concerning such a slidably contacting surface portion which has been only surface-treated, the slidably contacting surface portion is high in friction coefficient and therefore inferior in durability to slidable movement of the glass. In view of this, it has been proposed to form fine unevenness at the slidably contacting surface portion by causing the slidably contacting surface portion to contain solid antifriction material such as silicone resin, polyamide resin, fluorine-containing resin, polycarbonate resin, mica, molybdenum, calcium carbonate and the like, thereby forming fine unevenness at the slidably contacting surface portion. Otherwise, it has been proposed to cause the slidably contacting surface portion to contain silicone oil which is liable to provide a surface lubricity, thereby lowering the friction coefficient of the slidably contacting surface.

Further, it has been proposed to cause the main body of the weather strip to contain a solid particle-type antifriction material thereby forming fine unevenness at a surface to which another part is contactable, or to cause the weather strip main body to contain silicone oil thereby lowering the friction coefficient of the main body, as disclosed in Japanese Patent Provisional Publication No. 2000-52780 and Japanese Patent Publication No. 61-4408.

SUMMARY OF THE INVENTION

However, drawbacks have been encountered in the above slidably contacting surface portion of the weather strip or the main body of the weather strip, in which the slidably contacting surface portion of the weather strip or the surface of the weather strip main body has a characteristics to be liable to keep thereon dust which flies and comes or exists thereon. As a result, when dust is adhered on a surface to which a glass (plate) is slidably contactable, foreign noise is generated upon lowering in speed of the upward and downward movements of the glass and during the sliding movement of the glass to the surface of the weather strip. Particularly, when a bearing pressure of the glass to the surface of the weather strip becomes considerably high, generation of foreign noise becomes predominant. In an extreme case, the slidably contacting surface portion for the glass is peeled so that the surface of the main body of the weather strip is exposed, thereby making a condition in which the glass cannot make its upward and downward movements.

Additionally, a bearing pressure of the slidably contacting surface portion to the glass is set by the assembly position of the glass and the reaction of a lip section (seal lip) having the slidably contacting surface portion to which the surface treatment has been applied. In addition to this bearing pressure, the weather strip requires a characteristics to keep or secure the glass. Thus, the weather strip requires both a slidable characteristics and the keeping characteristics for the glass. Accordingly, it has hitherto been required to set the assembly position of the glass at a considerable accuracy.

It is, therefore, an object of the present invention to provide an improved weather strip which can effectively overcome drawbacks encountered in conventional weather strips.

Another object of the present invention is to provide an improved weather strip which is excellent in wear-resistance during sliding movement of another part (such as window or door glass) along the weather strip while effectively suppressing generation of foreign noise, without being affected by an assembly position of the another part.

An aspect of the present invention resides in a weather strip which comprises a main body formed of an elastomer. Additionally, a slidably contacting section to which a part other than the weather strip is slidably contactable is fixedly formed on the main body and contains a material having at least one of hydrophilicity and water absorbability. The slidably contacting section may be integral with the main body to form a one-piece structure, in which the slidably contacting section is formed of the elastomer, and the elastomer of the main body and the slidably contacting section contain the material having at least one of hydrophilicity and water absorbability.

Another aspect of the present invention resides in a weather strip which comprises a main body formed of an elastomer. Additionally, a slidably contacting section to which a part other than the weather strip is slidably contactable is fixedly formed on the main body and contains at least one material of powder material and fibrous material, having an elastic modulus ranging from 350 to 1300 MPa in a standard condition having a temperature of 23° C. and a relative humidity of 50%.

A further aspect of the present invention resides in a weather strip which comprises a main body formed of an elastomer. Additionally, a slidably contacting section to which a part other than the weather strip is slidably contactable is fixedly formed on the main body and formed of a material having an elastic modulus ranging from 90 to 250 MPa in a standard condition having a temperature of 23° C. and a relative humidity of 50%.

DETAILED DESCRIPTION OF THE INVENTION

Figure 1:
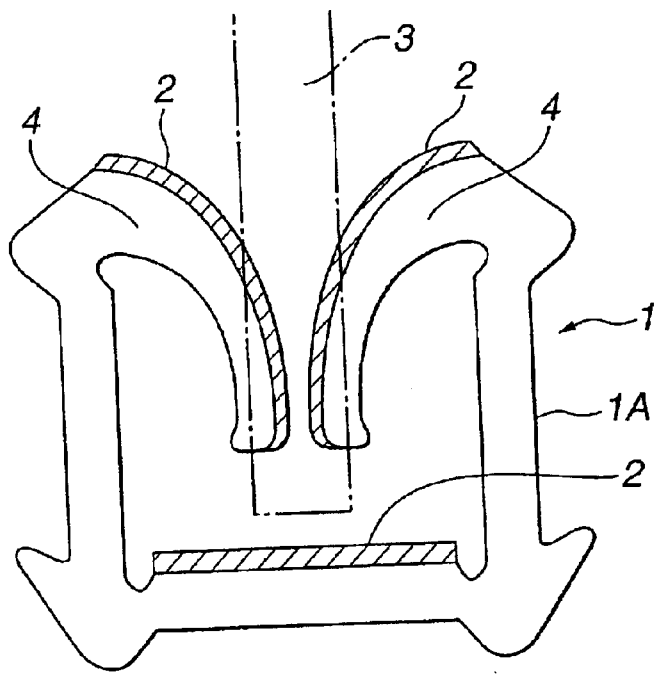
FIG. 1 is a cross-sectional view of an embodiment of a weather strip according to the present invention.

According to the present invention, a weather strip comprises a main body formed of an elastomer. A slidably contacting section to which a part other than the weather strip is slidably contactable is fixedly formed on the main body. The slidably contacting section may be integral with the main body to form a one-piece structure, in which the slidably contacting section is formed of the elastomer, and the elastomer of the main body and the slidably contacting section contain the material having at least one of hydrophilicity and water absorbability. The slidably contacting section may contain a material having at least one of hydrophilicity and water absorbability.

A typical example of the weather strip including the slidably contacting section containing hydrophilicity and/or water absorbability is produced as follows: A surface of the main body of the weather strip is coated with an organic material and/or an inorganic material which have hydrophilicity and/or water absorbability to form a coat layer, using as a binder. The binder contains a surface treatment agent which contains polyurethane as a major component, and/or a surface treatment agent which contains silicone as a major component. The surface of the main body is assumed to be subjected to a surface treatment. The binder is for bonding the organic material and/or the inorganic material to the surface of the main body of the weather strip. Another typical example of the weather strip is produced as follows: At least a surface portion or the whole of the main body of the weather strip contains the organic material and/or the inorganic material which have hydrophilicity and/or water absorbability. Examples of the elastomer are EPDM, a mixture of EPDM and SBR, TPO (thermoplastic polyolefin), and the like.

Otherwise, the weather strip of the present invention may be such arranged as to comprise a main body formed of an elastomer. Additionally, a slidably contacting section to which a part other than the weather strip is slidably contactable is fixedly formed on the mail body and contains at least one material of powder material and fibrous material, having an elastic modulus ranging from 350 to 1300 MPa in a standard condition having a temperature of 23° C. and a relative humidity of 50%. If the elastic modulus powder material and/or fibrous material is lower than 350, there is such a tendency that dust readily attaches to the slidably contacting section of the weather strip. If the elastic modulus of the powder material and/or fibrous material exceeds 1300 MPa, the part (such as a glass plate) other than the part against the slidably contacting of the weather strip is repeated.

Furthermore, the weather strip of the present invention may be such arranged as to comprise a main body formed of an elastomer. Additionally, a slidably contacting section to which a part other than the weather strip is slidably contactable is fixedly formed on the main body and formed of a material having an elastic modulus ranging from 90 to 250 MPa in a standard condition having a temperature 23° C. and a relative humidity of 50%. This elastic modulus range can be obtained by controlling a weight ratio between polyurethane and silicone in the above-mentioned binder, or by adding to the above-mentioned binder fine particle powder of polybutylene terephthalate, polyamide 6 (6-nylon), polyainide 66 (66-nylon), polyaxnide 6T (nylon 6T), polysulfone, poly(methyl methacrylate), polyvinyl chloride, polyoxymethylene (polyacetal), polyether imide, thermoplastic polyimide, polystyrene, PEEK, PPS, polyphenylene sulfide, polyamide imide, nylon MXD6, urea resin, phenol resin, melainine resin, and/or the like. If the elastic modulus is smaller than 90 MPa, there is such a tendency that dust readily attaches to the slidably contacting section of the weather strip. If the elastic modulus exceeds 250 MPa, noise due to sliding movement of the glass plate (such as a door glass) becomes larger.

As discussed above, the slidably contacting section of the weather strip may have the first feature of containing a material having at least one of hydrophilicity and water absorbability, the second feature of containing powder material and/or fibrous material having the elastic modulus ranging from 350 to 1300 MPa in the standard condition, and/or the third feature of being formed of the material having an elastic modulus ranging from 90 to 250 MPa in the standard condition. It will be understood that these three features can be used singly or in combination. In this regard, the combination of the above material having hydrophilicity and the above elastic modulus of the slidably contacting section is preferable.

With the weather strip provided with the above-discussed slidably contacting section, generation of foreign or unpleasant noises can be effectively suppressed even when a part (such as a glass plate or sheet) other than the weather strip slidably moves on the weather strip under a condition in which a high bearing pressure is applied between the part and the weather strip.

It is preferable that the slidably contacting section has a surface tension within a range of not lower than $3.8 \times 10^{-2}$ N/m in a standard condition having a temperature of 23° C. and a relative humidity of 50%. It is also preferable that the slidably contacting section has a contact angle of water, within a range of smaller than 85° in a standard condition having a temperature of 23° C. and a relative humidity of 50%. With such surface tension and/or water contact angle ranges, generation of foreign noise can be securely suppressed even in a condition in which the weather strip relatively slide on the other part (such as a glass) at a further high bearing pressure.

It is further preferable that the organic material and/or the inorganic material contained in the slidably contacting section has a SP value (solubility parameter) within a range of not smaller than 20 $(J/ml)^{1/2}$. With such a SP value range, foreign noise can be prevented from generation even under a sliding movement condition of the glass plate against the slidably contacting section of the weather strip at a further high bearing pressure. It is further preferable that the slidably contacting section has a surface roughness (Ra) ranging from 2.0 to 10.0 $\mu$m in a standard condition having a temperature of 23° C. and a relative humidity of 50%. With this surface roughness range, noise generation can be suppressed under the sliding movement condition at a further high bearing pressure. If the surface roughness is lower than 2.0 $\mu$m, noise generation cannot be effectively suppressed. If the surface roughness exceeds 10.0 $\mu$m, noise due to sliding movement of the door glass against the slidably contacting section of the weather strip becomes large.

In case that either one of the surface tension, the contact angle, the SP value and the surface roughness is not within the above-mentioned range, there is such a tendency that dust readily attaches to the slidably contacting section of the weather strip, as compared with a case that all the surface tension, the contact angle, the SP value and the surface roughness are respectively within the above-mentioned ranges.

The elastic modulus of the powder material and/or fibrous material, the elastic modulus of the slidably contacting section of the weather strip, the surface tension of the slidably contacting section, the contact angle of water for the slidably contacting section, and the surface roughness of the slidably contacting section can be determined by methods discussed after.

The above-mentioned organic material having hydrophilicity and/or water absorbability includes a material which is generally called water-absorbing polymer. Examples of the water-absorbing polymer are a polymer whose main component is polyacrylate, a polymer whose main component is a copolymer of isobutylene and maleate, a polymer whose main component is a graft copolymer of starch and acrylate, a polymer whose main component is a surface hydrolysis product of acrylic fiber, a polymer whose main component is polyvinyl alcohol, a polymer whose main component is cellulose, a polymer whose main components are a graft copolymer of starch and acrylate and cellulose, and a copolymer whose main component is polyamide. The above-mentioned organic material having hydrophilicity and/or water absorbability further includes a material which is generally called hydrophilic polymer. Example of the hydrophilic polymer are acrylic polymer, acrylonitrile, cross-linked polyvinyl alcohol, cross-linked polyoxyethylene, phenol resin, and derivative of hydroxybenzoic acid. Examples of the above-mentioned inorganic material having hydrophilicity and/or water absorbability are hydrophilic inorganic compounds such as hydrophilic metal oxide, alkali silicate, alkali borosilicate, alkali zirconate, and metal phosphate. It will be understood that any combination of the above exemplified organic materials and/or the above exemplified inorganic materials may be used in the weather strip of the present invention. Examples of the hydrophilic metal oxides are alumina ($Al_2O_3$), zirconia ($ZrO_2$), titania ($TiO_2$), and any combination of alumina, zirconia and titania.

In practice, it is preferable to use synthetic polymer(s) or inorganic material(s) as the above-mentioned organic material and/or the above-mentioned inorganic material from the viewpoints of durability, production cost and the like. Additionally, the above-mentioned water-absorbing polymer and/or the above-mentioned hydrophilic polymer may be used together with additive(s) such as silicone resin, polycarbonate resin, mica, molybdenum, calcium carbonate, and/or the like.

Examples of the above-mentioned powder material are polybutylene terephthalate, polyamide 6 (6-nylon), polyamide 66 (66-nylon), polyamide 6T (nylon), polysulfone, poly(methyl methacrylate), polyvinyle chloride, polyoxymethylene (polyacetal), polyether imide, thermoplastic polyimide, polystyrene, PEEK, PPS, polyphenylene sulfide, polyamide imide, nylon MXD6, urea resin, phenol resin, melamine resin, and the like. Examples of the above-mentioned fibrous material are 6-nylon, 66-nylon, nylon 6T, and the like.

Examples of the above-mentioned material having an elastic modulus ranging from 90 to 250 MPa are a surface treatment agent which contains polyurethane as a major component, a thermoplastic elastomer, and the like.

In case that the slidably contacting section is formed as a coat layer, the material of the slidably contacting section is formed as a sprayed coat layer by spray coating, as a roll coater layer by roll coater coating, as a gravure coat layer by gravure coating, as a film, as a brush coat layer by brush coating, as an extruded coat layer by extrusion molding, as an injected coat layer by injection molding, as a flock or pile layer, or as any combination of the above various coat layers.

Examples of the part other than the weather strip and making its sliding movement on the slidably contacting section of the weather strip are a door window (glass) panel or door glass, another weather strip, a coated film formed on an article, and a part formed of synthetic resin. The material of the slidably contacting section of the weather strip may contain solid particles, hardenable silicone oil, denatured silicone oil, tackifier, pigment, delustering agent, catalyst and various solvents for the purpose of meeting requirements of the part other than the weather strip.

EXAMPLES

The present invention will be more readily understood with reference to the following Examples in comparison with Comparative Examples; however, these Examples are intended to illustrate the invention and are not to be construed to limit the scope of the invention.

First, main body 1A of weather strip (glass run) 1 formed of ethylene-propylene rubber or elastomer was prepared. The main body was generally C-shaped in cross-section and included an extending generally flat bottom wall having two opposite side ends, and two extending generally flat side walls which were parallel with each other and integrally connected at its lower ends to the opposite side ends of the bottom wall, as shown in FIG. 1. The main body further included two extending lip sections 4 which were integrally connected at their upper ends respectively to the upper ends of the side walls, as shown in FIG. 1. Lip sections 4 extended downward to be located within a space defined by the bottom wall and the side walls so that the lower ends of lip sections 4 were positioned near the bottom wall. Lower end portions of the lip sections 4 were close to each other in such a manner that glass (plate) 3 is in slidable contact with the lower end portions of lip sections 4, as shown in FIG. 1.

A binder was prepared to serve as a base of slidably contacting section (for a glass 3) 2 and contained as main components polyurethane (obtained by condensation polymerization of polyester polyol and hexamethylene diisocyanate; the polyol having a molecular weight of 100000) and silicone (reactive silicone, having a molecular weight of 100000).

The binder in an amount of 100 parts by weight was diluted with 50 parts by weight of toluene (solvent) and 50 parts by weight of methyl ethyl ketone (MEK) to obtain a diluted binder. A powder or fiber was added to the diluted binder to obtain a mixture. This mixture was sprayed onto opposite curved surfaces of lip sections and onto the upper surface of the bottom wall of the main body of weather strip 1 by using a spray gun, thereby forming slidably contacting sections or coat layers 2 as shown in FIG. 1. Each slidably contacting section or coat layer 2 had a thickness of about 20 µm. Thereafter, the thus formed slidably contacting sections 2 were dried at 100° C. for 10 minutes. The above procedure was repeated to prepare the weather strip or glass run of each of Examples and Comparative Examples except for the specification of the powder.

The specification of the above powder or fiber was as follows:

In Examples 1 and 2, 10 parts by weight of phenol was used as the powder; In Example 3, 10 parts by weight of cellulose was used as the fiber; In Example 4, 10 parts by weight of poly(methyl methacrylate) was used as the powder; In Comparative Example 1, 10 parts by weight of polyethylene was used as the powder; In Comparative Example 2, 10 parts by weight of Teflon was used as the powder, as shown in Table 1 in which components are indicated as "parts by weight". Concerning Example 5 and Comparative Example 3, the powder or fiber was not used or added, in which a Teflon layer (film) having a thickness of 50 µm was bonded to the surface of the main body of the weather strip with acrylic adhesive tape so as to be used as the slidably contacting section in Example 5. The phenol used in Examples 1 and 2 was powder-like phenol resin and had hydrophilicity, an elastic modulus of 640 MPa, a SP value of 25.0 $(J/ml)^{1/2}$ and an average particle diameter of 10 $\mu$m. The cellulose used in Example 3 was cellulose fiber and had hydrophilicity, a SP value of 32.2 $(J/ml)^{1/2}$ and an average length of 10 $\mu$m. The poly(methyl methacrylate) used in Example 4 had an elastic modulus of 382 MPa. The polyethylene used in Comparative Example 1 was powder-like and had no hydrophilicity, an elastic modulus of powder of 258 MPa and a SP value of 16.2 $(J/ml)^{1/2}$. The Teflon used in Comparative Example 2 was powder-like and had an elastic modulus of powder of 240 MPa and a SP value of 12.7 $(J/ml)^{1/2}$.

Tests for evaluation of performance were conducted on the weather strip (sample) of each of Examples and Comparative Examples.

[Performance Evaluation 1]

The slidably contacting section of the weather strip (sample) of each of Examples and Comparative Examples underwent the tests to measure a surface tension and a contact angle of water for the slidably contacting section, an elastic modulus of the powder, an elastic modulus of the slidably contacting section, a surface roughness (Ra) of the slidably contacting section, and calculation to obtain the SP (solubility parameter) of the organic and/or inorganic material contained in the slidably contacting section.

Figure 4:
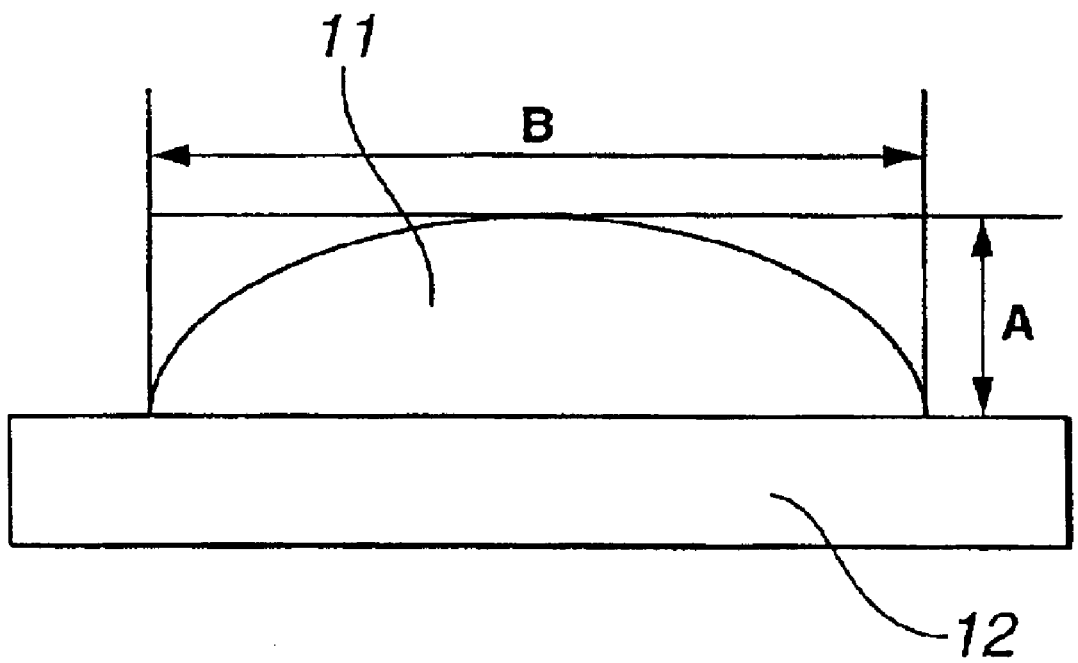
FIG. 4 is a schematic explanatory view showing a manner of measuring a surface tension and a contact angle for the weather strips.

The water contact angle and the surface tension were measured as follows:

As shown in FIG. 4, a droplet of distilled water 11 was dropped on the surface of the slidably contacting section 2 of a sample 12 of the weather strip in such a manner that the contact angle of the dropped water became the maximum. After 30 seconds from the dropping of water, dropped water 11 was observed from the just lateral side to measure a distance (height) A and a distance (width) B. The contact angle of water was calculated by the following equation:

Contact angle $\theta(water) = (180°/\pi) \times \tan^{-1}\{A/(B/2)\}$

Similarly, the distance A and the distance B of methylene iodide were measured to calculate the contact angle of methylene iodide. Then, the surface tension at the slidably contacting section of the sample was calculated according to the contact angle and the following equation:

$\gamma SV = \gamma LV \cos\theta + \gamma LS$  (Wu's Equation)

where $\gamma SV$ is the surface tension of solid, $\gamma LV$ is the surface tension of liquid, $\gamma LS$ is the interfacial tension between solid and liquid, and $\theta$ is the contact angle.

The elastic modulus of the powder and the elastic modulus of the slidably contacting section were measured under the following conditions by using a super light load thin film hardness tester produced by Hysitron Inc.: A maximum thrusting load was 20 $\mu$N; a load releasing speed was 16.7 $\mu$N/sec.; and a used indenter was of the Berkovich type (trigonal pyramid-shaped) and had a ridge angle (or angle formed between opposite inclined surfaces on a plane containing the axis of the indenter) of 143.2 degrees and a tip end diameter ranging from 100 to 200 nm.

The surface roughness (Ra) was measured according to JIS (Japanese Industrial Standard) B 0651-2001.

The SP (solubility parameter) value $(J/ml)^{1/2}$ was calculated according to the formula which was generally defined by $(\Delta E/V)^{1/2}$ where $\Delta E$ is cohesion energy of molecule; and V is molecular volume, the SP value representing a level in compatibility between polymers. The SP value is discussed in detail in Dictionary of Plastics Technology (pages 777 and 778) published on Oct. 20, 1994 by Kougyou Chousakai Kabushiki Kaisha.

As shown in Table 1, the slidably contacting section of the weather strip produced according to Example 1 has an elastic modulus within a range of from 90 to 250 MPa, a surface tension of not lower than $3.8 \times 10^{-2}$ N/m, a water contact angle of smaller than 85°, and a surface roughness within a range of from 2.0 to 10 $\mu$m. In the same slidably contacting section, the powder had an elastic modulus within a range of from 350 to 1300 MPa and a SP value of not smaller than 20 $(J/ml)^{1/2}$. Accordingly, it has been recognized that the weather strip of Example 1 is the best mode of the present invention.

The slidably contacting section of the weather strip produced according to Example 2 has an elastic modulus of lower than 90 MPa, a surface tension of lower than $3.8 \times 10^{-2}$ N/m, and a water contact angle of not smaller than 85°. However, the slidably contacting section has a surface roughness within a range of from 2.0 to 10 $\mu$m. In the same slidably contacting section, the powder has an elastic modulus within a range of from 350 to 1300 MPa and a SP value of not smaller than 20 $(J/ml)^{1/2}$. Accordingly, it has been recognized that the weather strip of Example 2 is the appropriate mode of the present invention.

The slidably contacting section of the weather strip produced according to Example 3 has an elastic modulus of lower than 90 MPa, and a surface roughness of lower than 2.0 $\mu$m. However, the slidably contacting section has a surface tension of not lower than $3.8 \times 10^{-2}$ N/m, and a water contact angle of smaller than 85°. In the slidably contacting section, the powder has a SP value of not smaller than 20 $(J/ml)^{1/2}$. Accordingly, it has been recognized that the weather strip of Example 3 is the appropriate mode of the present invention.

The slidably contacting section of the weather strip produced according to Example 4 has an elastic modulus of lower than 90 MPa, a surface tension of lower than $3.8 \times 10^{-2}$ N/m, and a water contact angle of not smaller than 85°. However, the slidably contacting section has a surface roughness within a range of from 2.0 to 10 $\mu$m. In the same slidably contacting section, the powder has an elastic modulus within a range of from 350 to 1300 MPa. Accordingly, it has been recognized that the weather strip of Example 4 is the appropriate mode of the present invention.

The slidably contacting section of the weather strip produced according to Example 5 has a surface tension of lower than $3.8 \times 10^{-2}$ N/m, a water contact angle of not smaller than 85°, and a surface roughness of smaller than 2.0 $\mu$m. In the same slidably contacting section, the powder has an elastic modulus of lower than 250 MPa. Accordingly, it has been recognized that the weather strips of Comparative Examples 1 to 3 do not correspond to the appropriate mode of the present invention.

In contrast, the slidably contacting sections of the weather strips produced according to Comparative Examples 1, 2 and 3 have an elastic modulus of lower than 90 MPa, a surface tension of lower than $3.8 \times 10^{-2}$ N/m, a water contact angle of not smaller than 85°, and a surface roughness of smaller than 2.0 $\mu$m. In the same slidably contacting section, the powder has an elastic modulus of lower than 350 MPa. Accordingly, it has been recognized that the weather strips of Comparative Examples 1 to 3 do not correspond to the appropriate mode of the present invention.

Figure 2:
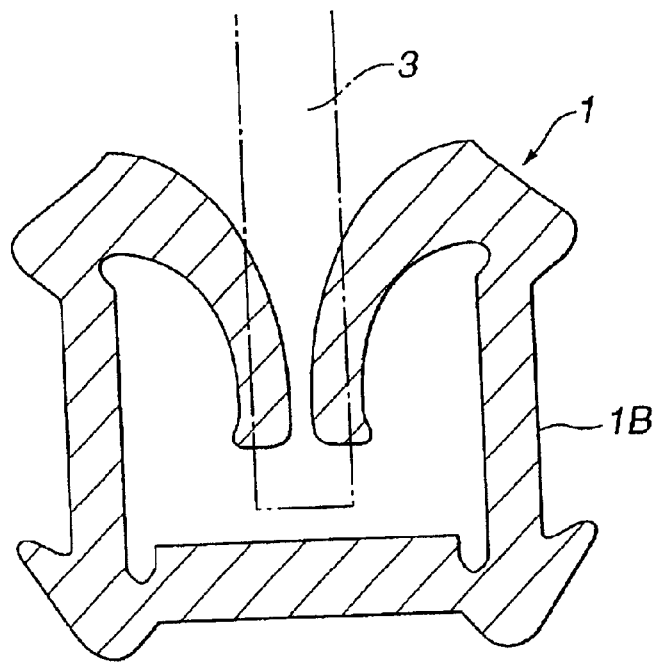
FIG. 2 is a cross-sectional view of another embodiment of the weather strip according to the present invention.

While slidably contacting section 2 of the weather strip has been specifically shown and described with reference to FIG. 1, it will be understood that the slidably contacting section may be formed into film or flock (pile) to be formed on the surface of the main body 1A of the weather strip as far as the slidably contacting section contains the organic material and/or the inorganic material which have hydrophilicity and/or water-absorbing ability; or that the water-adsorbing polymer (or the above organic material and/or the inorganic material) may be added or contained in a whole main body 1B of the weather strip as shown in FIG. 2 in which the whole main body 1B is formed of a uniform material or elastomer which uniformly contains the organic material and/or the inorganic material having hydrophilicity and/or water absorbability. It will be understood that the slidably contacting section may contain the powder material and/or fibrous material having the elastic modulus ranging from 350 to 1300 MP and/or have the elastic modulus ranging from 90 to 250 MPa independently from or in combination with the above feature that the slidably contacting section contains the organic material and/or the inorganic material which have hydrophilicity and/or water-absorbing ability.

Although the slidably contacting section has been shown and described as being formed by spraying, using the spray gun, the mixture (containing the binder and the material having hydrophilicity and water absorbability) onto the surface of the main body of the weather strip with reference to FIG. 1, it will be appreciated that the method of forming the slidably contacting section is not limited to the above one and therefore the slidably contacting section may be formed by brush coating, roll coating or the like, or formed by simultaneous extrusion molding of the slidably contacting section and the main body of the weather strip, cast molding, compression molding, injection molding or the like.

It will be understood that the materials of the slidably contacting section (such as the organic material and the inorganic material which have hydrophilicity and/or water absorbability) are not limited to ones used in Examples. Additionally, it will be appreciated that the contents of the same material in the slidably contacting section are not limited to ones shown in Table 1.

[Performance Evaluation 2]

The slidably contacting section of the weather strip of each of Examples and Comparative Examples underwent the tests to evaluate generation of foreign noise and wear of the slidably contacting section of the weather strip.

Figure 3A:
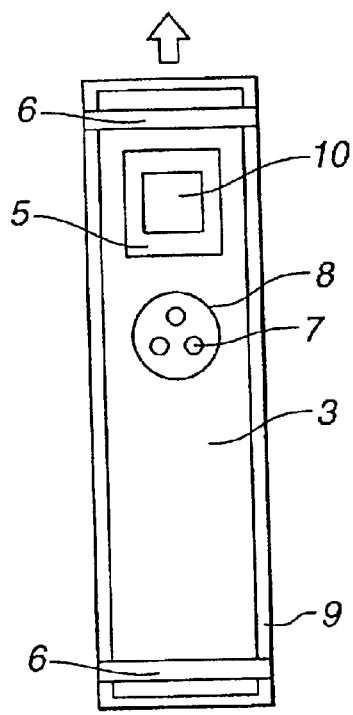
FIG. 3A is a plan view of a tester for evaluating the performance of preventing foreign noise generation and wear-resistance for weather strips.
Figure 3B:
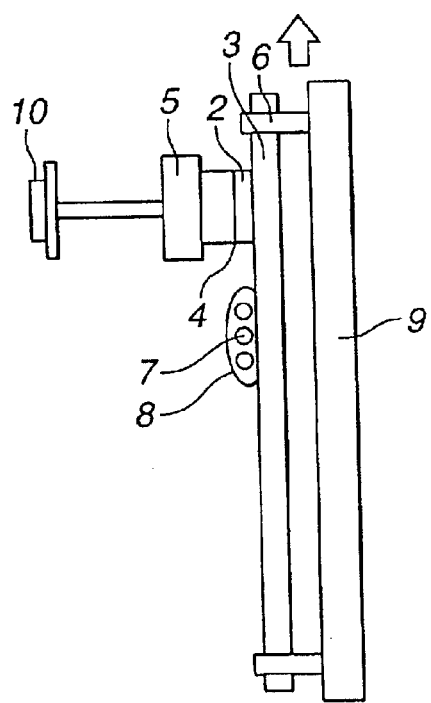
FIG. 3B is a side view of the tester of FIG. 3A.

The tests (bench tests) for evaluating foreign noise generation and wear were conduced as follows:

A section (having a size of 9 mm×9 mm×9 mm) was cut out from lip section 4 of weather strip 1 as shown in FIG. 1 to prepare a specimen including main body 1A and slidably contacting section 2. Then, the specimen was fixed to a jig 5 of a tester produced by Shinto Scientific Co., Ltd. under the trade name of HEIDON 1401B as shown in FIGS. 3A and 3B, in such a manner that the surface of slidably contacting section 2 faced glass (plate) 3 which was fixed through jigs 6 to a carrier stage 9 as shown in FIG. 3B. After a bearing pressure of the specimen against glass 3 was set with weight 10, 10 mg of dust (volcanic ash) 7 was located between slidably movable section 2 and glass 3, followed by dropping 5 ml of distilled water onto the dust. The bearing pressure was set at 1.0 kg/cm$^2$, at 1.5 kg/cm$^2$, at 2.0 kg/cm$^2$, at 2.5 kg/cm$^2$ and at 3.0 kg/cm$^2$. For the test, carrier stage 9 shown in FIG. 3B was moved in a reciprocating manner at a speed of 100 mm/sec and at a stroke of 100 mm in a direction parallel with an arrow in FIG. 3B, in which sliding noise generated at slidably contacting section 2 was measured by a microphone recorder (not shown) for the purpose of evaluation of performance of foreign noise generation suppression. Additionally, in this test, slidably movable section 2 (in slidable contact with glass 3) of the specimen was observed by an optical microscope at a first timing of completion of 500 times of the reciprocating movement of carrier stage 9, at a second timing of completion of 1000 times of the reciprocating movement of the carrier stage, and at a third timing of completion of 2000 times of the reciprocating movement of the carrier stage. In the observations, confirmation was made as to whether peeling of slidably contacting section 2 from the main body 1A of the specimen (weather strip) occurred or not for the purpose of evaluation of performance of durability.

Test or evaluation results of the weather strips are shown in Tables 2 and 3. The evaluation results for performance of foreign noise generation suppression at the bearing pressure of 1.0 kg/cm$^2$ are shown as Bench test foreign noise evaluation result I in Table 2; those at the bearing pressure of 1.5 kg/cm$^2$ are shown as Bench test foreign noise evaluation result II in Table 2; those at the bearing pressure of 2.0 kg/cm$^2$ are shown as Bench test foreign noise evaluation result III in Table 2; those at the bearing pressure of 2.5 kg/cm$^2$ are shown as Bench test foreign noise evaluation result IV in Table 2; and those at the bearing pressure of 3.0 kg/cm$^2$ are shown as Bench test foreign noise evaluation result V in Table 2. In Table 2, "A" represents such a result that no foreign noise was generated; and "B" represents such a result that foreign noise was generated. The evaluation results for performance of durability are shown as Bench test evaluation result in Table 3.

The weather strips of Examples 1 to 5 are the appropriate modes of the present invention, and therefore it has been confirmed that no foreign noise is generated in case that the bearing pressure is up to 1.5 kg/cm$^2$. Further, it has been demonstrated that the weather strip of Example 1 corresponding to the best mode of the present invention generates no foreign noise even in case that the bearing pressure is 3.0 kg/cm$^2$.

In contrast, the weather strips of Comparative Examples 1 to 3 are not the appropriate modes of the present invention, and therefore the slidably contacting sections of the weather strips have an elastic modulus of lower than 90 MPa, a surface tension of lower than 3.8×10$^{-2}$ N/m, a water contact angle of not smaller than 85°, and a surface roughness of smaller than 2.0 μm. Additionally, the powder contained in the slidably contacting sections has a SP value of lower than 20 (J/ml)$^{1/2}$ and an elastic modulus of lower than 350 MPa. As a result, it has been demonstrated in Table 2, that weather strips of Comparative Examples 1 to 3 generate foreign noise. Additionally, it has been demonstrated in Table 3, that peeling is occurred in the slidably contacting sections of the weather strips of Examples 1 to 3.

As apparent from the above, the slidably contacting section of the weather strips of Examples 1 to 5 contains the organic material and/or the inorganic material which have hydrophilicity and/or water absorbability, powder material and/or fibrous material having an elastic modulus ranging from 350 to 1300 MPa, and/or has an elastic modulus ranging from 90 to 250 MPa. Further, the slidably contacting section of the weather strips of Examples 1 to 5 may have a surface tension of not lower than 3.8×10$^{-2}$ N/m, a water contact angle of smaller than 85°, a surface roughness within a range of from 2.0 to 10 μm, and/or contain a material having a SP value of not smaller than 20 (J/ml)$^{1/2}$. It will be understood that the thus arranged slidably contacting sections are high in characteristics to prevent generation of foreign noise and high in wear-resistance or durability. Thus, the slidably contacting section of the present invention is very useful for a glass slidably contacting section (in slidable contact with a glass) of a weather strip.

As appreciated from the above, the present invention can provide the weather strip which is high in foreign noise generation-preventing effect and high in wear-resistance or durability during sliding movement of a part (such as a window or door glass) on the weather strip while being hardly affected by an assembly position of the part.

The entire contents of Japanese Patent Applications P2001-091812 (filed Mar. 28, 2001), P2001-334155 (filed Oct. 31, 2001) and P2002-078831 (filed Mar. 20, 2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

TABLE 1

| Sample | Example | | | | | Compar. Example | | |
|---|---|---|---|---|---|---|---|---|
| | 1 | 2 | 3 | 4 | 5 | 1 | 2 | 3 |
| Powder or fiber | | | | | | | | |
| Phenol | 10 | 10 | | | | | | |
| Cellulose | | | 10 | | | | | |
| Poly (methyl methacrylate) | | | | 10 | | | | |
| polyethylene | | | | | | 10 | | |
| Teflon | | | | | | | 10 | |
| Binder | | | | | | | | |
| Polyurethane | 70 | 40 | 40 | 40 | Teflon | 40 | 40 | 40 |
| Silicone | 30 | 60 | 60 | 60 | layer | 60 | 60 | 60 |
| Toluene | 50 | 50 | 50 | 50 | | 50 | 50 | 50 |
| MEK | 50 | 50 | 50 | 50 | | 50 | 50 | 50 |
| Elastic modulus of Powder (MPa) | 640 | 640 | 240 | 382 | — | 258 | 240 | — |
| Elastic modulus of slidably contacting section (MPa) | 95 | 88 | 85 | 88 | 240 | 88 | 80 | 80 |
| Surface tension ($\times 10^{-2}$ N/m) | 3.8 | 3.7 | 3.9 | 3.7 | 3.2 | 3.4 | 3.4 | 3.4 |
| Contact angle of water (°) | 84 | 86 | 83 | 87 | 90 | 90 | 92 | 92 |
| (SP value $(J/ml)^{1/2}$) | 25.0 | 25.0 | 32.2 | 19.1 | 12.7 | 16.2 | 12.7 | — |
| Surface roughness (Ra) | 2.4 | 2.5 | 1.8 | 2.2 | 1.8 | 1.8 | 1.7 | 1.9 |

TABLE 2

| Sample | Example | | | | | Compar. Example | | |
|---|---|---|---|---|---|---|---|---|
| | 1 | 2 | 3 | 4 | 5 | 1 | 2 | 3 |
| Powder of fiber | | | | | | | | |
| Phenol | 10 | 10 | | | | | | |
| Cellulose | | | 10 | | | | | |
| Poly(methyl methacrylate) | | | | 10 | | | | |
| polyethylene | | | | | | 10 | | |
| Teflon | | | | | | | 10 | |
| Binder | | | | | | | | |
| Polyurethane | 70 | 40 | 40 | 40 | Teflon | 40 | 40 | 40 |
| Silicone | 30 | 60 | 60 | 60 | layer | 60 | 60 | 60 |
| Toluene | 50 | 50 | 50 | 50 | | 50 | 50 | 50 |
| MEK | 50 | 50 | 50 | 50 | | 50 | 50 | 50 |
| Elastic modulus of Powder (MPa) | 640 | 640 | 240 | 382 | — | 258 | 240 | — |
| Elastic modulus of slidably contacting section (MPa) | 95 | 88 | 85 | 88 | 240 | 88 | 80 | 80 |
| (Surface tension ($\times 10^{-2}$ N/m)) | 3.8 | 3.7 | 3.9 | 3.7 | 3.2 | 3.4 | 3.4 | 3.4 |
| Contact angle of water (°) | 84 | 86 | 83 | 87 | 90 | 90 | 92 | 92 |
| SP value $(J/ml)^{1/2}$ | 25.0 | 25.0 | 32.2 | 19.1 | 12.7 | 16.2 | 12.7 | — |
| Surface roughness (Ra) | 2.4 | 2.5 | 1.8 | 2.2 | 1.8 | 1.8 | 1.7 | 1.9 |
| Bench test foreign noise evaluation result I Speed: 100 mm/sec. Bearing pressure: 1.0 kg/cm$^2$ | A | A | A | A | A | A | B | B |
| Bench test foreign noise evaluation result II Speed: 100 mm/sec. Bearing pressure: 1.5 kg/cm$^2$ | A | A | A | A | A | B | B | B |
| Bench test foreign noise evaluation result III Speed: 100 mm/sec. Bearing pressure: 2.0 kg/cm$^2$ | A | A | A | A | B | B | B | B |

TABLE 2-continued

| | Example | | | | | Compar. Example | | |
|---|---|---|---|---|---|---|---|---|
| Sample | 1 | 2 | 3 | 4 | 5 | 1 | 2 | 3 |
| Bench test foreign noise evaluation result IV Speed: 100 mm/sec. Bearing pressure: 2.5 kg/cm² | A | B | B | B | B | B | B | B |
| Bench test foreign noise evaluation result V Speed: 100 mm/sec. Bearing pressure: 3.0 kg/cm² | A | B | B | B | B | B | B | B |

TABLE 3

| | Example | | | | | Compar. Example | | |
|---|---|---|---|---|---|---|---|---|
| Sample | 1 | 2 | 3 | 4 | 5 | 1 | 2 | 3 |
| Powder or fiber | | | | | | | | |
| Phenol | 10 | 10 | | | | | | |
| Cellulose | | | 10 | | | | | |
| Poly (methyl methacrylate) | | | | 10 | | | | |
| polyethylene | | | | | | 10 | | |
| Teflon | | | | | | | 10 | |
| Binder | | | | | | | | |
| Polyurethane | 70 | 40 | 40 | 40 | Teflon | 40 | 40 | 40 |
| Silicone | 30 | 60 | 60 | 60 | layer | 60 | 60 | 60 |
| Toluene | 50 | 50 | 50 | 50 | | 50 | 50 | 50 |
| MEK | 50 | 50 | 50 | 50 | | 50 | 50 | 50 |
| Elastic modulus of Powder (MPa) | 640 | 640 | 240 | 382 | — | 258 | 240 | — |
| Elastic modulus of slidably contacting section (MPa) | 95 | 88 | 85 | 88 | 240 | 88 | 80 | 80 |
| Surface tension (×10⁻²N/m) | 3.8 | 3.7 | 3.9 | 3.7 | 3.2 | 3.4 | 3.4 | 3.4 |
| Contact angle of water (°) | 84 | 86 | 83 | 87 | 90 | 90 | 92 | 92 |
| (SP value (J/ml)^{1/2}) | 25.0 | 25.0 | 32.2 | 19.1 | 12.7 | 16.2 | 12.7 | — |
| Surface roughness (Ra) | 2.4 | 2.5 | 1.8 | 2.2 | 1.8 | 1.8 | 1.7 | 1.9 |
| Bench test evaluation result Speed: 100 mm/sec. Bearing pressure: 1.5 kg/cm² | | | | | | | | |
| Frequency of reciprocating movement: 1 to 500 times | No abnormality | No abnormality | No abnormality | No abnormality | No abnormality | No abnormality | No abnormality | Peeling occurred |
| Frequency of reciprocating movement: 501 to 1000 times | No abnormality | No abnormality | No abnormality | No abnormality | No abnormality | Peeling occurred | Peeling occurred | Peeling occurred |
| Frequency of reciprocating movement: 1001 to 2000 times | No abnormality | No abnormality | No abnormality | No abnormality | No abnormality | Peeling occurred | Peeling occurred | Peeling occurred |

What is claimed is:

1. A weather strip comprising:
   a main body formed of an elastomer; and
   a slidably contacting section to which a part other than the weather strip is slidably contactable, said slidably contacting section being fixedly formed on said main body and containing a material having at least one of hydrophilicity and water absorbability, wherein said slidably contacting section having a contact angle of water of less than 85° as measured at a temperature of 23°C. and a relative humidity of 50%.

2. A weather strip as claimed in claim 1, wherein said slidably contacting section contains at least one material of powder material and fibrous material, having an elastic modulus ranging from 350 to 1300 MPa in a standard condition having a temperature of 23° C. and a relative humidity of 50%.

3. A weather strip as claimed in claim 1, wherein said slidably contacting section has an elastic modulus ranging from 90 to 250 MPa in a standard condition having a temperature of 23° C. and a relative humidity of 50%.

4. A weather strip as claimed in claim 1, wherein said slidably contacting section contains at least one material of powder material and fibrous material, having an elastic modulus ranging from 350 to 1300 MPa in a standard condition having a temperature of 23° C. and a relative humidity of 50%, wherein said slidably contacting section has an elastic modulus ranging from 90 to 250 MPa in the standard condition.

5. A weather strip as claimed in claim 1, wherein said slidably contacting section has a surface tension within a range of not lower than 3.8×10-2 N/m in a standard condition having a temperature of 23° C. and a relative humidity of 50%.

6. A weather strip as claimed in claim 1, wherein said slidably contacting section contains at least one of organic material and inorganic material, having a SP value within a range of not smaller than 20 (J/ml)^{1/2}.

7. A weather strip as claimed in claim 1, wherein said slidably contacting section has a surface roughness (Ra) ranging from 2.0 to 10.0 μm in a standard condition having a temperature of 23° C. and a relative humidity of 50%.

8. A weather strip as claimed in claim 1, wherein said slidably contacting section is at least one selected from the group consisting of a sprayed coat layer formed by spray coating, a roll coater layer formed by roll coater coating, a gravure coat layer formed by gravure coating, a film layer, a brush coat layer formed by brush coating, an extruded coat layer formed by extrusion molding, an injected coat layer formed by injection molding, and a flock layer.

9. A weather strip as claimed in claim 1, wherein said part other than the weather strip is a door window panel.

10. A weatherstrip as claimed in claim 1, wherein said slidably contacting section is integral with said main body to form a one-piece structure, in which said slidably contacting section is formed of an elastomer, said elastomer of said main body and said slidably contacting section containing said material having at least one of hydrophilicity and water absorbability.

11. A weather strip as claimed in claim 1, wherein said material having at least one of hydrophilicity and water absorbability-is at least one selected from the group consisting of a water-absorbing polymer, a hydrophilic polymer and an inorganic hydrophilic compound.

12. A weather strip as claimed in claim 1, wherein said slidably contacting section is a layer coated on said main body, said layer containing said material having at least one of hydrophilicity and water absorbability in an amount ranging from 1 to 10 parts by weight; and a binder for bonding said material onto a surface of said main body, in an amount ranging from 50 to 200 parts by weight.

13. A weather strip as claimed in claim 12, wherein said material is one selected from the group consisting of acrylic water-absorbing polymer, derivative of hydroxybenzoic acid and phenol.

14. A weather strip as claimed in claim 13, wherein said binder contains at least one of polyurethane and silicone.

15. A weather strip comprising:

a main body formed of an elastomer; and a slidably contacting section to which a part other than the weather strip is slidably contactable, wherein said slidably contacting section being fixedly formed on said main body and comprising a powder and/or fibrous material, having an elastic modulus ranging from 350 to 1300 MPa as measured at a temperature of 23° C. and a relative humidity of 50% and wherein said slidably contacting section having a contact angle of water of less than 85° as measured at a temperature of 23° C. and a relative humidity of 50%.

16. A weather strip as claimed in claim 15, wherein said slidably contacting section has an elastic modulus ranging from 90 to 250 MPa in a standard condition having a temperature of 23° C. and a relative humidity of 50%.

17. A weather strip as claimed in claim 15, wherein said slidably contacting section contains at least one of organic material and inorganic material, having a SP value within a range of not smaller than 20 $(J/ml)^{1/2}$.

18. A weather strip as claimed in claim 15, wherein said slidably contacting section has a surface roughness (Ra) ranging from 2.0 to 10.0 µm in a standard condition having a temperature of 23° C. and a relative humidity of 50%.

19. A weather strip comprising:

a main body formed of an elastomer; and a slidably contacting section to which a part other than the weather strip is slidably contactable, wherein said slidably contacting section being fixedly formed on said main body and formed of a material having an elastic modulus ranging from 90 to 250 MPa as measured at a temperature of 23° C. and a relative humidity of 50% and wherein said slidably contacting section having a contact angle of water of less than 850 as measured at 23° C. and a relative humidity of 50%.

20. A weather strip as claimed in claim 19, wherein said slidably contacting section contains at least one of organic material and inorganic material, having a SP value within a range of not smaller than 20 $(J/ml)1/2$.

21. A weather strip as claimed in claim 19, wherein said slidably contacting section has a surface roughness (Ra) ranging from 2.0 to 10.0 µm in a standard condition having a temperature of 23° C. and a relative humidity of 50%.

22. A weather strip comprising:

a main body formed of an elastomer; and a slidable contacting section to which a part other than the weather strip is slidably contactable, said slidable contacting section being fixedly formed on said main body and containing at least one material of powder material and fibrous material, having an elastic modulus ranging from 350 to 1300 MPa as measured at a temperature of 23° C. and a relative humidity of 50%.

23. A weather strip comprising:

a main body formed of an elastomer; and a slidable contacting section to which a part other than the weather strip is slidably contactable, said slidable contacting section being fixedly formed on said main body and formed of a material having anelastic modulus ranging from 90 to 250 MPa as measured at a temperature of 23° C. and a relative humidity of 50%, and wherein said slidable contacting section has a surface tension within a range of not lower than $3.8 \times 10^{-2}$ N/m as measured at a temperature of 23° C. and a relative humidity of 50%.

* * * * *